Oct. 8, 1968  H. L. TRAUTMANN  3,404,584
TRANSMISSION
Filed April 4, 1966  3 Sheets-Sheet 1
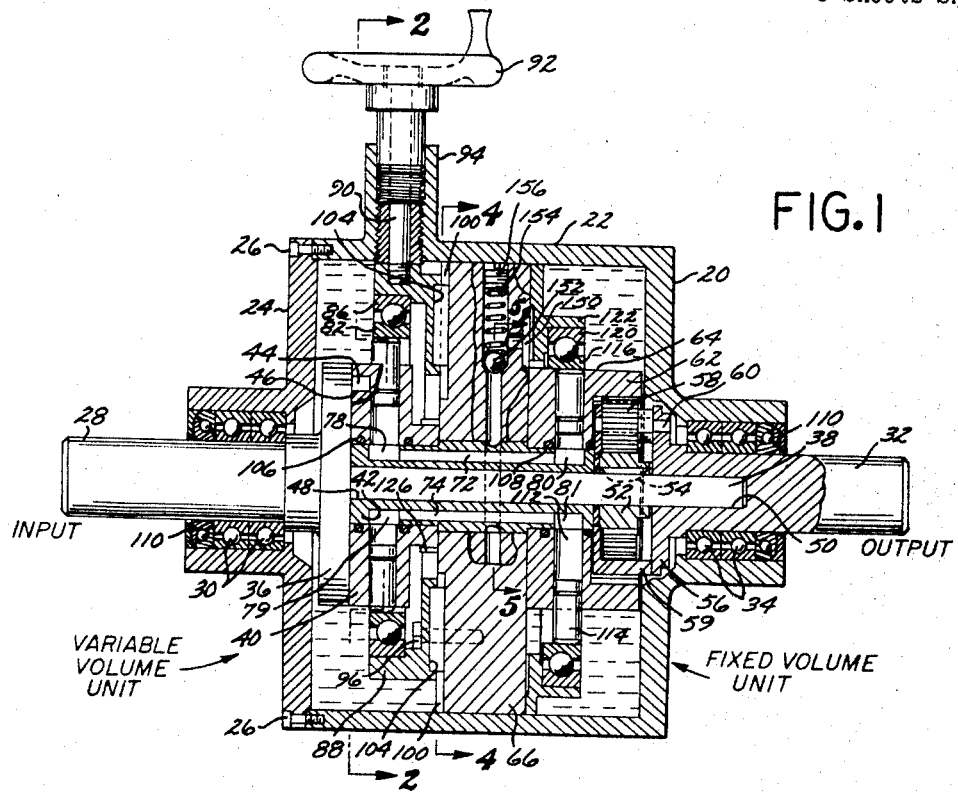
FIG. 1
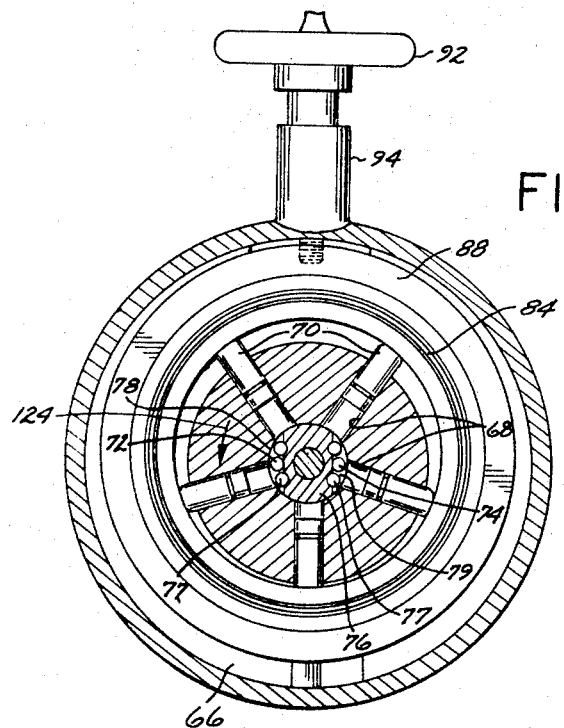
FIG. 2
INVENTOR.
HERBERT L. TRAUTMANN
BY
ATTORNEY Oct. 8, 1968   H. L. TRAUTMANN   3,404,584
TRANSMISSION
Filed April 4, 1966   3 Sheets-Sheet 2
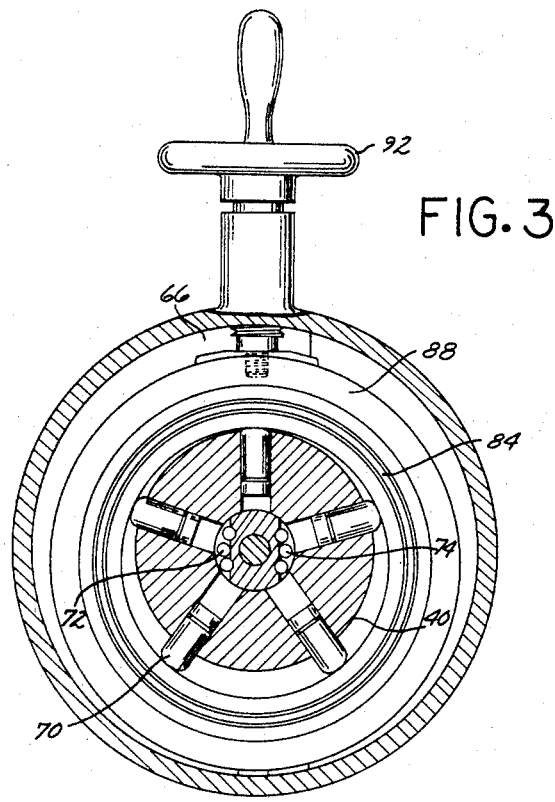
FIG. 3
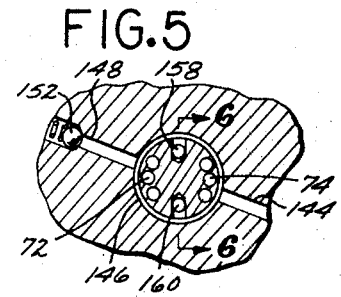
FIG. 5
FIG. 6
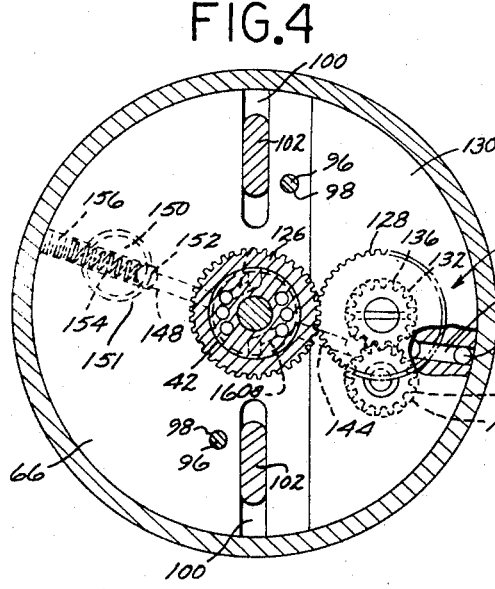
FIG. 4
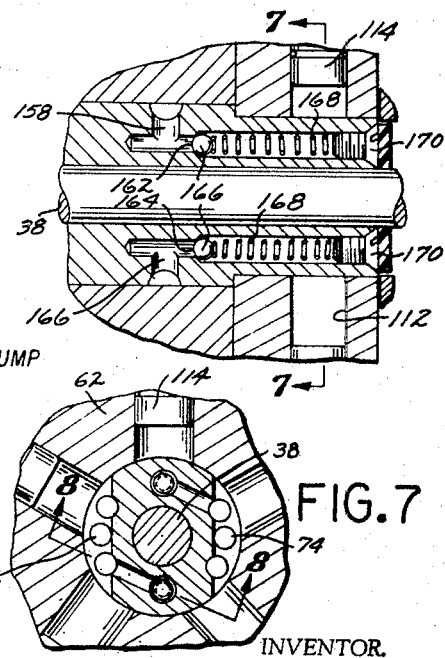
FIG. 7
INVENTOR.
HERBERT L. TRAUTMANN
BY
ATTORNEY Oct. 8, 1968  H. L. TRAUTMANN  3,404,584
TRANSMISSION
Filed April 4, 1966  3 Sheets-Sheet 3

INVENTOR.
HERBERT L. TRAUTMANN
BY
ATTORNEY 3,404,584
TRANSMISSION
Herbert L. Trautmann, 873A W. 15th St.,
Newport Beach, Calif. 92660
Filed Apr. 4, 1966, Ser. No. 539,777
11 Claims. (Cl. 74—687)

ABSTRACT OF THE DISCLOSURE

This invention pertains to a fluid transmission which is substantially continuously variable over a wide range of gear ratios. It is characterized by having a mechanically driven variable volume fluid motor or flow unit for producing a flow of fluid which is adjustably variable in volume and direction. Such flow is conducted to a fixed volume fluid motor or flow unit for actuation according to the volume and direction of fluid flow from the variable volume unit. A ring gear is driven directly by the fixed volume unit, and a sun gear is driven in accordance with the variable volume unit. One or more planetary gears are arranged between the ring gear and sun gear so that an output speed is obtained from the rotation of the planetary gear about the axis of the sun gear according to the algebraically combined speeds and directions of the sun and ring gears.

---

The present invention relates generally to transmissions, and more particularly to a new and useful fluid operated transmission.

Transmissions are used to provide a variable speed or gear ratio which can be adjusted to best utilize the input speeds available and produce output speeds that are desired or required. The common automobile transmission, for example, utilizes a range of input speeds from the engine to produce desired output speeds at the rear wheels to drive the automobile. A low speed or gear ratio is normally used when the automobile is being driven slowly, and higher ratios are used as the speed of the automobile is increased. The torque output is, of course, higher for the low gear ratios than for the high gear ratios. The automobile transmission is also normally adjustable to provide reverse as well as forward output speeds for a given direction of input speed.

Fluid transmission presently used in modern automobiles and various machinery are usually fairly complex, and involve a large number of intricate components or elements. The transmission units, moreover, are frequently quite large and bulky, especially where an increased number of speed or gear ratios are used. For smooth and efficient operation of automobiles or machinery, a relatively large number of such speed or gear ratios is required. This number of speed or gear ratios is, however, limited by the permissible complexity and size of the transmission required.

It is an object of the present invention to provide a fluid transmission which is finely adjustable to give a speed or gear ratio that is substantially continuously variable over a wide range, but is relatively simple of construction and small in size.

Another object of the invention is to provide a fluid operated transmission which is easily adjusted to vary the speed or gear ratio and the direction of output speed therefrom.

A further object of the invention is to provide a fluid operated transmission having a novel structure which is extremely compact for the range and adjustability of speed or gear ratio possible with the transmission.

A still further object of the present invention is to provide a fluid transmission which is continuously adjustable, for a given input speed, through a range of reverse output speeds to zero output speed, and through a range of forward output speeds.

Briefly, and in general terms, the foregoing and other objects are preferably accomplished by providing a fluid transmission comprising a combination of a mechanically driven variable volume fluid flow unit for producing a flow of fluid which is adjustably variable in volume and direction, a fixed volume fluid flow unit connecting with the variable volume unit and responsively actuated according to the volume and direction of fluid flow to drive an associated ring gear, and a sun gear and meshing planetary gears arrangement having the sun gear mechanically driven with the variable volume unit and the ring gear engaging with the planetary gears so that an output speed is obtained from the rotation of the planetary gears about the axis of the sun gear according to the algebraically combined speeds and directions of the sun gear and the ring gear.

The invention will be more fully understood, and other objects and advantages will become apparent from the following detailed description of an illustrative embodiment of my invention to be taken in conjunction with the attached drawings, in which:

FIGURE 1 is a central, sectional view of the illustrative embodiment of my invention, a portion of the figure being shown angularly rotated from its true position for clarity of illustration;

FIGURE 2 is a sectional view of the fluid transmission taken along the line 2—2 as indicated in FIGURE 1, showing an adjustable ring bearing eccentrically positioned at the upper extremity of its vertical travel;

FIGURE 3 is a sectional view similar to that of FIGURE 2 except that the adjustable ring bearing is shown eccentrically positioned at the lower extremity of its vertical travel;

FIGURE 4 is a sectional view of the transmission taken along the line 4—4 as indicated in FIGURE 1;

FIGURE 5 is a fragmentary sectional view taken along the line 5—5 as indicated in FIGURE 1;

FIGURE 6 is a fragmentary sectional view taken along the line 6—6 as indicated in FIGURE 5;

FIGURE 7 is a fragmentary sectional view taken along the line 7—7 as indicated in FIGURE 6;

Figure 9:
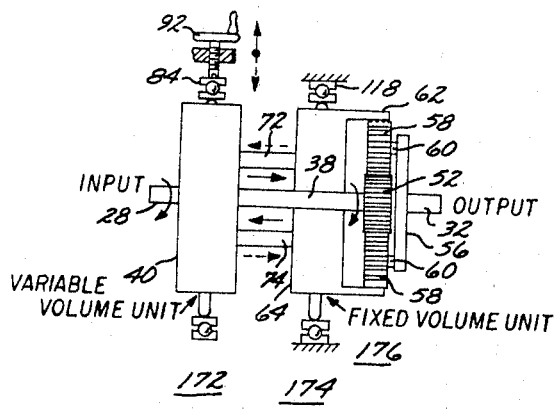
FIGURE 9 is a drawing schematically illustrating the fluid transmission.

A central, sectional side elevation view of a preferred embodiment of my invention is shown in FIGURE 1. A compact fluid transmission is shown wherein housing 20 encloses the different parts of the fluid transmission. The housing 20 is normally fixed, and includes a body 22 and an end cover 24 which is suitably secured to the body 22 by means of screws 26. The housing 20 axially mounts an input shaft 28 on bearings 20, and an axially aligned output shaft 32 on bearings 34. The input shaft 28 has a flange 36 located within the housing 20 next to the end cover 24 and has a reduced diameter shaft 38 extending beyond the flange 36. A disc 40 is rotatably mounted on a fixed concentric spool 42 and is driven by the input shaft 28 through a pin 44 projecting from the flange 36 and engaging a hole 46 in the face of the disc 40. The reduced diameter shaft 38 extends axially through a central hole 48 in spool 42 and the end of the shaft 38 is rotatably journaled in a central recessed hole 50 in the output shaft 32. A sun gear 52 is keyed to the shaft 38 by a key 54 near the end thereof. The output shaft 32 has a flange 56 which mounts three planetary gears 58 in a cage 59 rotatably on pins 60. The planetary gears 58 are equal angularly spaced about the flange 56 and mesh with a ring gear 62 which is integrally affixed to a disc 64. The disc 64 is similar to the disc 40, and is also rotatably mounted on the spool 42. The discs 40 and 64 are separated by a wall 66 which mounts and connects the spool 42 to the side walls of the housing body 22.

The sectional view of FIGURE 2 is taken along the line 2—2 as indicated in FIGURE 1, and illustrates the structure of the disc 40 and the spool 42. The disc 40 has a number of radial bores 68 which mount respective pistons 70. The spool 42 has two sets of longitudinal passageways 72 and 74 which are separated by a dividing wall 76. In FIGURE 1, the spool 42 has been rotated approximately 90° clockwise from its actual orientation as seen in FIGURE 2. The two sets of passageways 72 and 74 are thus functionally illustrated more clearly in FIGURE 1. The two sets of passageways 72 and 74 each includes three longitudinal bores 77 made in the spool 42, and the ends of the bores 77 are terminated and connected together by slots 78, 79, 80, and 81. The disc 40 is mounted on the spool 42 such that the radial bores 68 are aligned with the left slots, and the inner ends of the bores 68 connect with the slots when the radial bores 68 rotate past the open end of each of the left slots 78 and 79.

The pistons 70 are closely fitted to their respective radial bores 68, and the outer ends of the pistons 70 bear against the inner raceway 82 of a ring bearing 84. The outer raceway 86 of the ring bearing 84 is mounted to an adjustment plate 88. The adjustment plate 88 is attached at the top to the lower end of a bolt 90. The bolt 90 is axially mounted to a turnscrew 92, as shown in FIGURE 1. The turnscrew 92 turns freely about the bolt 90, and the threaded shaft of the turnscrew 92 engages the internal thread of the neck 94 of the housing body 22. When the turnscrew 92 is rotated freely about the bolt 90 so that the turnscrew is moved downward into the body 22 of the housing 20, the adjustment plate 88 and its mounted ring bearing 84 is moved downward with respect to the disc 40. The ring bearing 84 is thus positionable from a central position in which it is concentric with the disc 40 to eccentric positions above or below the central concentric position. The ring bearing 84 is shown eccentrically positioned at its upper limit of travel in FIGURE 2, and its lower limit of travel in FIGURE 3.

The adjustment plate 88 is secured to the wall 66 by a pair of screws 96, the shafts of which pass through respective vertical slots in the adjustment plate 88. The screws 96 are threaded into the wall 66 such that the heads of the screws 96 hold the adjustment plate evenly against the wall 66 to permit vertical movement of the adjustment plate. The screws 96 engage threaded holes 98 in the wall 66 as shown in FIGURE 4. A pair of vertically aligned guide slots 100 are provided in the face of the wall 66 to engage the sides of a pair of guide blocks 102 which respectively engage recessed slots 104 in the adjustment plate 88, as shown in FIGURE 1. Thus, as the turnscrew 92 is rotated to move the adjustment plate 88 vertically, the heads of the screws 96 maintain the adjustment plate evenly against the surface of the wall 66 while the guide blocks 102 are moved in the guide slots 100.

The disc 40 is rotatably mounted on the left end of the spool 42 and has a number of radial bores 68 mounting pistons 70 such that the inner ends of the radial bores 68 connect with the left end slots 78 and 79 as the disc 40 is rotated. A pair of O-ring seals 106 are suitably mounted in grooves located on both sides of the bores 68. As can be seen in FIGURE 1, the O-ring seals 106 engage the spool 42 on both sides of the left slots 78 and 79. The disc 64 is similarly constructed as the disc 40, and also mounts a pair of O-ring seals 108 in circular grooves disposed similarly as those in the disc 40. The two sets of passageways 72 and 74, and the radial bores in the discs 40 and 64 are filled with a viscous fluid such as oil, and the seals 106 and 108 are provided to minimize any leakage resulting from rotation of the discs 40 and 64. It is to be noted that these seals 106 and 108 can be eliminated if a close fit is provided between surfaces of the discs 40 and 64 with those of the spool 42. The interior of the housing 20 is also filled with the same viscous fluid, and serves as a reservoir or supply of fluid for the passageways 72 and 74 and radial bores in discs 40 and 64. Suitable seals 110 are provided at each end of the housing 20 about the input and output shafts 28 and 32.

The disc 64 has a number of radial bores 112 which are similar and equal in number to the radial bores 68 in the disc 40. The radial bores 112 similarly mount pistons 114 which are also similar to the pistons 70 in the disc 40. The outer ends of the pistons 114 engage the inner raceway 116 of a ring bearing 118 which is similar to the ring bearing 84. The outer raceway 120 of the ring bearing 118 is secured to a mounting plate 122, which is suitably attached to the right face of the wall 66. The mounting plate 122 mounts the ring bearing 118 eccentrically with respect to the disc 64 as shown in FIGURE 1. The ring bearing 118 is eccentrically positioned with respect to the disc 64 in a manner similar to that of the ring bearing 84 with respect to the disc 40 as shown in FIGURE 3.

The disc 40 has a gear 126 integrally located on the hub of the disc 40, and this gear 126 meshes with another gear 128 as shown in FIGURE 4. The wall 66 includes a segment plate 130 which covers a portion of the wall that is suitably machined to house a primer pump 131 for supplying fluid under pressure to the passageways 72 and 74. The pump 131 is used mainly to keep the passageways 72 and 74, and free spaces in the radial bores 68 and 112 completely and continuously filled with fluid. Two contiguous cylindrical hollows 132 and 134 are made in the wall 66 to accommodate two meshing pump gears 136 and 138, respectively. The flat bottoms of the cylindrical hollows 132 and 134 are further bored to rotatably mount one end of the shafts of the pump gears 136 and 138. The segment plate 130 is similarly bored to rotatably mount the other end of the shafts of the pump gears 136 and 138. The hub of the gear 128 is pinned to the shaft of the pump gear 136 which extends above the surface of the segment plate 130. A hole 140 drilled longitudinally parallel to the axis of the spool 42 through the segment plate 130 and wall 66 near the edge, as shown in FIGURE 4, provides a connecting passageway to the fluid within the housing 20 on both sides of the wall 66.

A generally radial hole 142 is drilled perpendicular to the longitudinal hole 140, intersecting therewith and further intersecting with the two cylindrical hollows 132 and 134 on one side of the meshing point of the two gears 136 and 138. This provides a passageway which supplies oil from the interior of the housing 20 to the pump gears 136 and 138. On the other side of the meshing point of the two gears 136 and 138, another passageway 144 is provided radially in the wall 66, connecting the cylindrical hollows 132 and 134 to a ring groove 146 made around the middle of the outer surface of the spool 42, as shown in FIGURE 1. Diametrically opposite the radial passageway 144 is another radial passageway 148 which also connects with the ring groove 146. This passageway 148 connects with a port 150 provided in the wall 66 through a relief valve 151 including a ball bearing 152, a spring 154, and an adjustment screw 156 for adjusting the pressure of the spring against the ball bearing 152 to seal the outlet of the passageway 148. As is apparent, the relief valve passageway 148, port 150, as well as the spool passageways 72 and 74 have been shown rotated to the plane of FIGURE 1 from their positions in FIGURE 4, for clarity of illustration.

Figure 8:
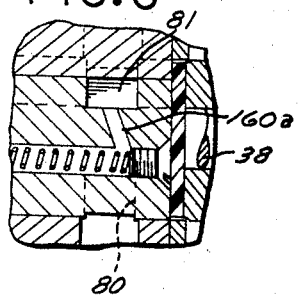
FIGURE 8 is a fragmentary sectional view taken along the line 8—8 as indicated in FIGURE 7.

FIGURE 5 shows a sectional view taken along the line 5—5 as indicated in FIGURE 1, and shows the connection of the two passageways 144 and 148 with the ring groove 146. The ring groove 146 is connected by two passageways 158 and 160, respectively, to the two sets of passageways 72 and 74. These passageways 158 and 160 include one-way valves 162 and 164 (FIGURE 6) which permit entrance of fluid only to the passageways 72 and 74. The one-way valves 162 and 164 each include a ball bearing 166, a spring 168, and an adjustment screw 170. The ball bearings 166 are seated in the passageways 158 and 160 near the ring groove 146, as shown in FIGURE 6. FIGURE 7 is a sectional view which shows the connection of the passageways 158 and 160 throguh the one-way valves 162 and 164 to the passageways 72 and 74 by passageways 158a and 160a respectively. FIGURE 8 shows a sectional view taken along the line 8—8 as indicated in FIGURE 7 to illustrate the connection of the one-way valve 164 with the right slot 81 connecting with the passageway 74. Similarly, the passageway 158 connects the ring groove 146 through the one-way valve 162 to the right slot 80 which connects with the passageway 72.

Rotation of the disc 40 in the direction of the arrow 124 in FIGURE 2 would cause the gear 126 to be rotated in a clockwise direction as viewed in FIGURE 4. The meshing gear 128 would be rotated in a counterclockwise direction, as would be the pump gear 136. The other pump gear 138 would be rotated in a clockwise direction. Thus, as the pump gears 136 and 138 are rotated, fluid brought to the cylindrical hollows 132 and 134 through the connecting holes 140 and 142 is carried around the periphery of the hollows by the gears 136 and 138 to the passageway 144 and ring groove 146. When there is a drop in pressure in the passageways 72 or 74, then the one-way valves 162 or 164 will be opened under pressure of the pump gears 136 and 138 to supply fluid to the passageways 72 or 74. Fluid will be delivered only to the passageway with a low pressure since the other passageway would then have a high pressure which prevents the one-way valves 162 or 164 from opening. Thus, the passageways 72 and 74 including the radial bores 68 and 112 will be kept filled with fluid under pump pressure due to the pump gears 136 and 138 which are driven continuously. In the event that the passageways and radial bores are completely filled with fluid and pressure is built up excessively by the pump gears 136 and 138, the relief valve 151 is operated whereby the ball bearing 152 compresses the spring 154 to permit discharge of fluid through the port 150.

In operation, the disc 40 and the sun gear 52 are driven in one direction respectively by the input shaft 28 and the reduced diameter shaft 38. When the ring bearing 84 is eccentrically positioned with respect to the disc 40, as shown in FIGURE 2, the pistons 70 to the left of a central vertical line dividing the disc 40 in FIGURE 2, will be moved gradually inwardly as the disc 40 is rotated in the direction of arrow 124. As the inner ends of the radial bores 68 join the left slot 78 connecting with the passageway 72, pressure would be produced in this passageway 72 as the pistons 70 are moved inwardly by the eccentrically positioned ring bearing 84. The fluid pressure developed in the passageway 72 will be directed to the pistons 114 which are disposed with respect to the ring bearing 118 in a manner similar to that shown in FIGURE 3 for the disc 40. The pistons 114 to the left of a central vertical line dividing the disc 64 (for a view similar to that of FIGURE 3) will be moved outwardly under pressure in the passageway 72. Since the ring bearing 118 is eccentrically positioned with respect to the pistons 114 in a manner similar to that shown in FIGURE 3, the ends of the pistons 114 will engage an inclined surface to the left of the central vertical line, such that the disc 64 will be caused to rotate in a counterclockwise direction.

As the pistons 114 are moved outwardly to the left of the central line dividing the disc 64, fluid will be collected in the radial bores 112. As the disc 64 rotates past the dividing wall 76 in the spool 42 to the right of the central vertical line dividing the disc 64, the pistons 114 are then compressed by the eccentrically positioned ring bearing 118. The inner ends of the cylindrical bores 112 then join with the right slot 81 connecting with the passageway 74 to deliver fluid collected in the radial bores 112 to the passageway 74. This fluid moves down the passageway 74 to the left slot 79 joining with the passageway 74. The inner ends of the radial bores 68 to the right of the central vertical line dividing the disc 40 in FIGURE 2, connect with the passageway 74 so that the fluid enters the radial bores 68 as the pistons 70 are permitted to move outwardly against the eccentrically positioned ring bearing 84. The fluid collected in the cylinders of the radial bores 68 on the right of the central vertical line dividing the disc 40 in FIGURE 2 will be returned to the passageway 72 as these bores rotate past the dividing wall 76. Thus, a fluid flow is produced which moves from the disc 40 down the passageway 72 to the disc 64 and back through the passageway 74 to the disc 40. The rotation of the disc 64 causes the ring gear 62 to rotate in a direction similar to that of the sun gear 52 so that the planetary gears are rotated about the axis of the sun gear 52 to produce a rotation of the output shaft 32 at a speed which is an additive combination of the speeds of rotation of the sun gear 52 and the ring gear 62.

When the turnscrew 92 is adjusted so that ring bearing 84 is moved downward from the position shown in FIGURE 2 toward a position wherein the ring bearing 84 is concentric with the disc 40, movement of the pistons 70 will be progressively reduced until they become stationary when the ring bearing is concentric with the disc 40. Fluid flow in the passageways 72 and 74 also decreases and stops and rotation of the disc 64 is reduced until the disc 64 becomes stationary. The ring bearing 84 is then concentric with the disc 40 and no fluid flow occurs in the passageways 72 and 74. The speed of rotation of the output shaft 32 is gradually reduced with the rotation of the ring gear 62, and when the ring gear 62 becomes stationary, the output shaft 32 is driven at a speed produced only by rotation of the sun gear 52 driving the planetary gears 58 about the stationary ring gear 62.

When the turnscrew 92 is adjusted to further move the ring bearing 84 downward with respect to the disc 40 to a condition as shown in FIGURE 3, the action of the pistons 70 with respect to the ring bearing 84 is such that pressure is produced by the pistons 70 in the passageway 74 which, when acting on pistons 114 of the disc 64, causes the disc 64 to rotate in a clockwise direction for a view similar to that of FIGURE 3, and fluid is returned in the passageway 72. The ring gear 62 is then rotated in a direction opposite to that of the sun gear 52 such that the planetary gears 58 are caused to rotate about the axis of the sun gear 52 at a speed which is due to a differential combination of the rotations of the sun gear 52 and the ring gear 62.

When the ring bearing 84 is moved past the central concentric position with respect to the disc 40, sufficiently to cause a fluid flow which will drive the disc 64 and ring gear 62 at a speed which nullifies the rotation of the sun gear 52, a zero output speed of the output shaft 32 is obtained. As the ring bearing 84 is moved further downward from this zero output speed position, the fluid flow in the passageways 72 and 74 increases such that the speed of rotation of the disc 64 and the ring gear 62 would exceed that of the sun gear 52 such that the planetary gears 58 and output shaft 32 will be rotated in a direction opposite to that of the sun gear 52. Thus, the ring bearing 84 can be adjusted from a position which gives a zero output speed of the output shaft 32 upward to produce an increasing speed of rotation of the output shaft in the same direction of rotation as the sun gear 52. When the ring bearing 84 is gradually moved downward from the zero output speed position of the output shaft 32, an increasing rotation speed of the output shaft 32 in a direction opposite to that of the sun gear 52 is obtained.

The fluid transmission is shown schematically in FIGURE 9, and can be seen broadly to be a combination of a variable volume flow unit 172, a fixed volume flow unit 174, and a sun gear and planetary gear arrangement 176. The variable volume flow unit 172 includes the disc 40, ring bearing 84 and a turnscrew 92. The fixed volume flow unit 174 includes disc 64 and ring bearing 113. The sun gear and planetary gear arrangement 176 includes sun gear 52, planetary gears 58 and the ring gear 62 which is integrally affixed to the disc 64. The disc 40 is driven by the input shaft 28 and the sun gear 52 is driven by the reduced diameter shaft 38. Passageways 72 and 74 connect the discs 40 and 64 together as indicated. When the turnscrew 92 is adjusted so as to move the ring bearing 84 either upward or downward from a concentric position with respect to the disc 40, fluid flow in the passageways 72 and 74 would flow in one direction or the other, as indicated by the solid line arrows and broken line arrows, respectively. Volume of fluid flow increases with increase of eccentricity of the ring bearing 84 with respect to the disc 40. The sun gear 52 is driven with the disc 40, since the reduced diameter shaft 38 is merely an extension of the input shaft 28. The planetary gears 58 mesh with both the sun gear 52 and the ring gear 62 and are rotatably mounted on pins 60 which are affixed to the flange 56 of the output shaft 32.

Figure 10:
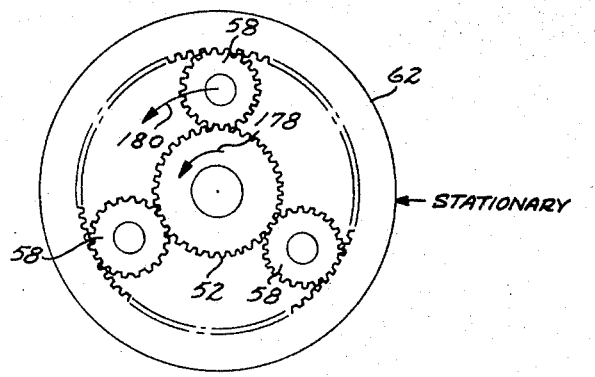
FIGURES 10, 11 and 12 are diagrammatic drawings which illustrate the resultant movement of the planetary gears for different movements of the ring gear engaging with the planetary gears.

FIGURE 10 diagrammatically illustrates the resulting movements of the sum gear 52, planetary gears 58, and ring gear 62 when the ring bearing 84 is concentrically positioned with respect to the disc 40. Since the ring bearing 84 is concentrically positioned with respect to disc 40, the pistons 70 remain evenly fixed so that no fluid flow would be produced in the passageways 72 and 74. The disc 64 is not driven so that the ring gear 62 will be stationary, as indicated in FIGURE 10. Rotation of the sun gear 52 in the direction of the arrow 178 will cause the planetary gears 58 to be rotated about the axis of the sun gear 52 in the direction of the arrow 180, as indicated in the figure. Thus, the output shaft 32 will be also rotated in the direction of the arrow 180. For the proportionate sizes of the gears approximately illustrated in FIGURE 10, a 4:1 speed ratio, for example, would be obtained from the planetary gears 58 about the axis of the sun gear 52. Thus, the output shaft 32 will be rotated at one-fourth the speed of the sun gear 52.

Figure 11:
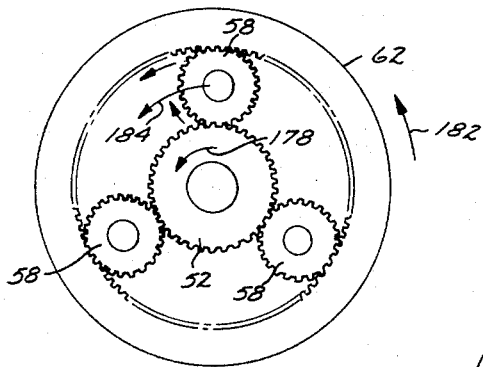

When the ring bearing 84 is moved upwardly with respect to the disc 40, fluid flow will take place in the passageways 72 and 74, as indicated by the solid arrows shown beside the passageways in FIGURE 9. The ring gear 62 will then be rotated in the direction of the arrow 182, as indicated in FIGURE 11. The speed of rotation of the ring gear 62 will be increased with increase of fluid flow in the passageways 72 and 74, caused by the increased eccentricity of the ring bearing 84 with respect to the disc 40. The planetary gears 58 will be rotated about the axis of the sun gear 52 as shown before when the ring gear 62 was stationary, and will be additionally driven about the axis of the sun gear 52 in the same direction by the rotation of the ring gear 62. Thus, the planetary gears 58 will be rotated about the axis of the sun gear 52, as indicated by the arrow 184, at an increasing speed ratio. As the ring bearing 84 is moved upward from a central concentric position with respect to the disc 40, the speed ratio is increased from a 4:1 ratio up to a 1:1 ratio in the illustrative example shown. A higher speed ratio is thus obtained with increasing speed of the output shaft 32.

Figure 12:
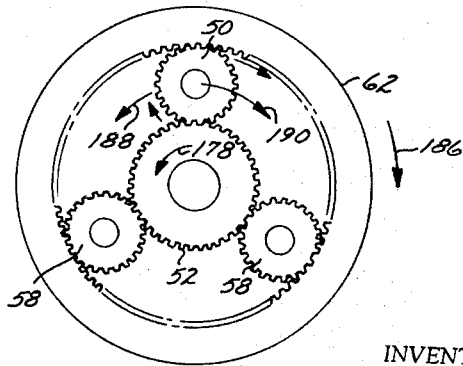

When the ring bearing 84 is moved downwardly from a central concentric position with respect to the disc 40, fluid flow in the passageways 72 and 74 is reversed, as indicated by the broken line arrows positioned beside the passageways in FIGURE 9. The ring gear 62 is then rotated in a direction opposite to that of the sun gear 52, as indicated by the arrow 186 in FIGURE 12.

Since the ring gear 62 is rotated in a direction opposite to the sun gear 52, the forward rotation of the planetary gears 58 as indicated by the arrow 188 will be gradually reduced until the planetary gears become stationary about the axis of the sun gear 52. This condition is obtained when the ring bearing 84 is moved downward a short distance from the central concentric position where the ring gear 62 was stationary, to a position where the reversed rotation of the ring gear 62 effectively nullifies the forward rotation of the sun gear 52 in driving the planetary gears 58. When the ring bearing 84 is moved further downward beyond the position in which the planetary gears 58 are stationary about the axis of the sun gear 52, the reversed fluid flow in the passageways 72 and 74 is increased so that the speed of rotation of the ring gear 62 is also increased. The result is that the planetary gears 58 will then move in a reverse direction as indicated by the arrow 190. Low speed ratios are involved since the output speed of the output shaft 32 is dependent upon a differential combination of the speeds of the sun gear 52 and the ring gear 62.

While a manual turnscrew 92 has been shown for adjusting the position of the ring bearing 84, other adjustment means can obviously be used. For example, it may be desired to position the ring bearing in discrete steps instead of as finely as provided by the screw arrangement. In this instance, a lever arm having a number of detent positions can be used. Of course, mechanism providing a combination of both coarse and fine adjustments can be used as desired. The adjustment means can also be made automatically responsive to speed, for example, and standard servo circuits can be employed to control the adjustment means in response to the output of a speedometer or the like.

Other modifications of my invention can obviously be made, and it is to be understood that the particular embodiment of the invention described above and shown in the drawings is merely illustrative of, and not restrictive on my broad invention, and that various changes in design, structure, and arrangement may be made without departing from the spirit and scope of the broader of the appended claims.

I claim:
1. A transmission comprising:
   a spool having first and second passageways therein, each end of said passageways terminating near respective ends of said spool;
   a first disc rotatably mounted near an end of said spool and having a plurality of bores mounting respective pistons therein, said bores of said first disc having innner ends each communicating with successive ends of said passageways terminating near said spool end mounting said first disc as the latter is rotated;
   a first ring bearing normally concentrically positioned about said first disc and eccentrically adjustable with respect to said first disc, said pistons of said first disc having outer ends engaging an inner peripheral surface of said first ring bearing;
   a second disc rotatably mounted near the other end of said spool and having a plurality of bores mounting respective pistons therein, said bores of said second disc having inner ends each communicating with successive ends of said passageways terminating near said spool end mounting said second disc as the latter is rotated;
   a second ring bearing eccentrically positioned about said second disc, said pistons of said second disc having outer ends engaging an inner peripheral surface of said second ring bearing;
   a ring gear rotatably connected to said second disc;
   a sun gear rotatably mounted on an axis;
   a planetary gear meshing with said sun gear and said ring;

a fluid filling said passageways and free space in said bore of said discs; and means for rotatably driving said first disc, whereby a flow of fluid is produced between said first and second discs through said pasageways when said first ring bearing is positioned eccentrically with respect to said first disc, said flow of fluid being varied in volume and direction according to the eccentric adjustment of said first ring bearing with respect to said first disc and said second disc being responsively rotated according to the volume and direction of said flow of fluid to drive said ring gear and provide an output speed from rotation of said planetary gear about the axis of said sun gear according to an algebraic combination of speeds and directions of said ring and sun gears.

2. A transmission comprising:

a spool having first and second passageways therein;

a first disc rotatably mounted relative to said spool and having at least one bore mounting a piston therein, said bore having an inner end communicating with said passageways as said disc is rotated;

means for moving said piston in said bore as said disc is rotated, said means being adjustably variable to vary the amount of movement of said piston with each revolution of said disc;

a second disc rotatably mounted relative to said spool and having at least one bore mounting a piston therein, said bore having an inner end communicating with said passageways as said second disc is rotated;

means for moving said piston in the bore of said second disc as the latter is rotated;

a ring gear rotatably connected to said second disc;

a sun gear rotatably mounted on an axis;

a planetary gear meshing with said sun and ring gears;

a fluid filling said passageways and free space in said bore of said discs; and means for rotatably driving said first disc, whereby a flow of fluid is produced between said first and second discs through said passageways, said flow of fluid being varied in volume and direction according to the adjustment of the piston moving means of said first disc and said second disc being responsively rotated according to the volume and direction of said flow of fluid to drive said ring gear and provide an output speed from rotation of said planetary gear about the axis of said sun gear according to an algebraic combination of speeds and directions of said ring and sun gears.

3. A transmission comprising:

a spool having first and second passageways therein;

a first disc rotatably mounted relative to said spool and having at least one bore mounting a piston therein, said bore having an inner end communicating with said passageways as said disc is rotated;

a first ring normally concentrically positioned about said first disc and eccentrically adjustable with respect thereto, said piston of said first disc having an outer end engaging an inner peripheral surface of said ring;

a second disc rotatably mounted relative to said spool and having at least one bore mounting a piston therein, said bore having an inner end communicating with said passageways as said second disc is rotated;

a second ring eccentrically positioned about said second disc, said piston of said second disc having an outer end engaging an inner peripheral surface of said second ring;

a ring gear rotatably connected to said second disc;

a sun gear rotatably mounted on an axis;

a planetary gear meshing with said sun and ring gears, a fluid filling said passageways and free space in said bore of said discs; and means for rotatably driving said first disc, whereby a flow of fluid is produced between said first and second discs through said passageways when said first ring is positioned eccentrically with respect to said first disc, said flow of fluid being varied in volume and direction according to the eccentric adjustment of said first ring with respect to said first disc and said second disc being responsively rotated according to the volume and direction of said flow of fluid to drive said ring gear and provide an output speed from rotation of said planetary gear about the axis of said sun gear according to an algebraic combination of speeds and directions of said ring and sun gears.

4. A transmission according to claim 2, comprising further: prime pump means for maintaining said passageways and free space in said bores of said discs filled under pump pressure with said fluid.

5. A transmission according to claim 2, wherein said sun gear is rotatably connected to said drive means to be driven in accordance with the rotation of said first disc.

6. A transmission according to claim 2, comprising further:

a reservoir of fluid connecting with said passageways;

and primer pump means for maintaining said passageways and free space in said bores of said discs filled under pump pressure with fluid from said reservoir.

7. A transmission according to claim 2, wherein said spool is formed with an axial hole and said transmission comprises further:

a driven input shaft having a reduced diameter shaft axially affixed thereto, said input shaft being adapted to drive said first disc and said reduced diameter shaft extending through said axial hole of said spool;

and an output shaft rotatably mounted on an axis, said planetary gear being rotatably mounted to said output shaft of an axis spaced apart from the axis of said output shaft.

8. A transmission according to claim 7, comprising further:

a housing for said spool and having a filling of fluid therein;

primer pump means for maintaining said passageways and free space of said bores of said disc filled under pump pressure with fluid from said housing;

a third passageway connecting an input of said pump means to said fluid in said housing;

and fourth and fifth passageways respectively connecting an output of said pump means to said first and second passageways.

9. A transmission as defined in claim 8 including one-way valves connecting said fourth and fifth passageways respectively to said first and second passageways for preventing fluid flow out of said first and second passageways into said fourth and fifth passageways.

10. A transmission as defined in claim 8 including a sixth passageway connecting said fourth and fifth passageways to said fluid in said housing, and a relief valve positioned in said sixth passageway for permitting discharge of fluid to said fluid in said housing when pressure is built up excessively in said fourth and fifth passageways.

11. A transmission as defined in claim 8 including one-way valves connecting said fourth and fifth passageways respectively to said first and second passageways for preventing fluid flow out of said first and second passageways into said fourth and fifth passageways, a sixth passageway connecting said fourth and fifth passageways, to said fluid in said housing, and a relief valve positioned in said sixth passageway for permitting discharge of fluid to said fluid in said housing when pressure is built up excessively in said fourth and fifth passageways.

(References on following page)

References Cited

UNITED STATES PATENTS

| | | | |
|---|---|---|---|
| 932,033 | 8/1909 | Krone | 60—53 |
| 1,502,310 | 7/1924 | Magie et al. | 60—53 |
| 1,904,496 | 4/1933 | Maw | 60—53 |
| 2,336,912 | 12/1943 | Zimmermann | 74—687 |
| 3,283,612 | 11/1966 | Densham | 74—687 |
| 3,293,943 | 12/1966 | Macdonald | 74—687 |
| 3,300,000 | 1/1967 | Stoyke | 60—53 |

FOREIGN PATENTS 245,707  7/1963  Australia.

EDGAR W. GEOGHEGAN, *Primary Examiner.*